(12) United States Patent
Jendbro et al.

(10) Patent No.: US 7,906,891 B2
(45) Date of Patent: Mar. 15, 2011

(54) LIGHT CONTROL OF AN ELECTRONIC DEVICE

(75) Inventors: Magnus Jendbro, Staffanstorp (SE); Gunnar Klinghult, Lund (SE); Mats Kleverman, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 496 days.

(21) Appl. No.: 12/040,438

(22) Filed: Feb. 29, 2008

(65) Prior Publication Data

US 2009/0195861 A1    Aug. 6, 2009

Related U.S. Application Data

(60) Provisional application No. 61/026,265, filed on Feb. 5, 2008.

(51) Int. Cl.
*H01L 41/09* (2006.01)
(52) U.S. Cl. .......................... 310/800; 310/328
(58) Field of Classification Search ............. 310/328, 310/800
See application file for complete search history.

(56) References Cited

U.S. PATENT DOCUMENTS

| | | | | |
|---|---|---|---|---|
| 5,186,813 | A * | 2/1993 | Helms | 205/171 |
| 6,800,988 | B1 * | 10/2004 | Ribak | 310/365 |
| 7,473,499 | B2 * | 1/2009 | Hyde et al. | 430/5 |
| 2004/0108479 | A1 * | 6/2004 | Garnier et al. | 251/129.01 |
| 2004/0213982 | A1 * | 10/2004 | Touzov | 428/304.4 |
| 2005/0156942 | A1 * | 7/2005 | Jones | 345/589 |
| 2005/0157893 | A1 * | 7/2005 | Pelrine et al. | 381/190 |
| 2005/0187602 | A1 * | 8/2005 | Eidenschink | 623/1.11 |
| 2006/0022951 | A1 * | 2/2006 | Hull | 345/170 |
| 2006/0113880 | A1 * | 6/2006 | Pei et al. | 310/800 |
| 2008/0191585 | A1 * | 8/2008 | Pelrine et al. | 310/363 |

FOREIGN PATENT DOCUMENTS

| | | |
|---|---|---|
| EP | 0 564 127 A2 | 10/1993 |
| KR | 10-0650190 | 11/2006 |
| WO | WO 2005/083547 A2 | 9/2005 |
| WO | WO 2007/104829 A1 | 9/2007 |

OTHER PUBLICATIONS

International Search Report issued in corresponding international application No. PCT/EP2008/057628, mailed Oct. 20, 2008, 3 pages.
Bar-Cohen, Y.: "Muscling into Motion", SPIE'S OEMagazine, Dec. 2001, p. 29.
Huang, C. et al. "Electroactive Polymer (EAP) Based Deformable Micromirrors and Light-Valve Technology for MOEMS Display and Imaging Systems", Proceedings of SPIE, vol. 5389, 2004, pp. 274-285.

* cited by examiner

*Primary Examiner* — Thomas M Dougherty
(74) *Attorney, Agent, or Firm* — Harrity & Harrity, LLP (57) ABSTRACT

The invention is directed towards an electronic device including at least one electro active polymer element. The at least one electro active polymer element includes an electrode. The at least one electro active polymer element is configured to change volume when a voltage is applied to the electrode, where the change in volume results in a change in a luminous transmittance of the electro active polymer element.

18 Claims, 4 Drawing Sheets

LIGHT CONTROL OF AN ELECTRONIC DEVICE

RELATED APPLICATION

The present application claims prior to U.S. Provisional Application No. 61/026,265, filed Feb. 5, 2008, the entirety of which is incorporated by reference herein

BACKGROUND

The present invention relates to the field of electronic devices. More particularly, the present invention relates to an electronic device and method for light control of an electronic device.

Many users of a portable electronic device may be interested in using the device in various unfavorable lighting conditions such as e.g. at night time, in rain, dust and fog; or indoors, in shady bars, smoke filled clubs, restaurants, etc. It may then be a problem to identify e.g. the keys on the keyboard of the portable electronic device, but also to identify other functionalities of an electronic device such as the mode of the electronic device.

An existing solution to that problem is to provide the portable electronic device with Light Emitting Diodes (LEDs). However, if a plurality of LEDs are arranged on top of each other in order to create illumination in a plurality of different colors, this may lead to a bulky design of the portable electronic device, but also to the use of a lot of LEDs and a complex power management situation in order to synchronize the light emitting scheme for the portable electronic device.

Further, it may also be a problem to communicate information to the user without emitting sounds, for example, in locations where such emitted sound from the portable electronic device may be disturbing for the environment, e.g. on a theatre, a concert hall, a restaurant, a meeting, or the like. There exist a plurality of information that may be displayed to the user of a portable electronic device such as an indication of the battery status, status report indicating the signal propagation conditions, the time, the date, which mode the device is currently operating, an icon indicating missed calls, incoming messages etc. For example, the receipt of an SMS may cause an icon or a user interface to appear on the display of the portable electronic device.

However, such icons, information and visual indicators typically occupy valuable display area, and may sometimes be disturbing or even exceedingly annoying to the user, even to an extent where the readability of the display is jeopardized. A cramped display may cause severe visibility problems, e.g., in case all or a plurality of the above mentioned events occur simultaneously and may cause misinterpretation or even exclude the disabled or dyslectic user from using the portable electronic device.

One possible solution may be to enlarge the display area. However, the modest physical size of contemporary portable electronic devices, which is desirable for reasons of portability, put a limit to the display size. Accordingly, it is a problem with user devices such as portable electronic devices that all notification and information is visualized only on one single display with limited size.

It is also a problem to produce an illumination scheme on a portable electronic device comprising fading in and/or fading out lights and thus create dimmer effects. Unfortunately, there exists no convenient way of achieving such illumination effects.

Further, it may be desired to be able to control the illumination of separate keys on the keyboard of a portable electronic device. According to present technology this can be achieved by adding a separate LED for each key, which needs individual control. This adds LEDs and thus also extra costs, volume, weight, and complexity to the portable electronic device. It may further be a problem with light leaking between the different keys. Existing keypads or keyboards typically employ uniform lighting or backlight for the entire keypad.

SUMMARY OF THE INVENTION

According to one implementation, an electronic device may be provided. The electronic device may include at least one electro active polymer element, where the at least one electro active polymer element includes an electrode, and where the at least one electro active polymer element is configured to change volume when a voltage is applied to the electrode, where the change in volume results in a change in a luminous transmittance of the electro active polymer element.

In addition, the electronic device may include a housing enclosing a first translucent part and a second translucent part; and a light source, where the at least one electro active polymer element is situated between the first translucent part and the second translucent part, and where the at least one electro active polymer element is configured to change the luminous transmittance of a light from the light source and propagating between the first translucent part and second translucent part, when voltage is applied to the electrode.

In addition, the housing may enclose a plurality of translucent parts and a plurality electro active polymer elements may be situated between at least some of the translucent parts. The plurality of electro active polymer elements may be configured to change the luminous transmittance of light from the light source and propagating between the plurality of translucent parts when the voltage is applied to the electrode, such that an effect of light fading from a first one of the plurality of translucent parts to a second one of the plurality of translucent parts is created.

In addition, the plurality of translucent parts may include keys on a keypad associated with the electronic device.

In addition, the electronic device may include a light source configured to illuminate at least one side of the electro active polymer.

In addition, the voltage applied to the electrode may be configured to vary continuously, resulting in a continuously increased or decreased volume of the at least one electro active polymer element, such that the luminous transmittance of the at least one electro active polymer element varies correspondingly, resulting in a fading effect of the light emitted from the light source.

In addition, the electro active polymer may include an ionic electro active polymer.

In addition, the ionic electro active polymer may include ionic polymer gel.

In addition, the electro active polymer may include one of an ionomeric polymer-metal composite or carbon nanotubes.

In addition, the electronic device may include a portable communication device.

In addition, the portable communication device may include a cellular telephone.

In addition, the electrode may include a set of electrodes, where the voltage is applied across the set of electrodes.

According to another aspect, a method for creating a light effect in an electronic device may include detecting a trigger signal; applying a voltage to a set of electrodes operatively coupled to an electro active polymer element upon detection of the trigger signal; and modifying a characteristic of the electro active polymer element based on the applied voltage.

In addition, the characteristic of the electro active polymer element may include a physical volume of the electro active polymer element.

In addition, the trigger signal may include a signal corresponding to an incoming call or message signal associated with the electronic device.

In addition, the trigger signal may include a signal corresponding to a mode of use of the electronic device.

In addition, modifying the characteristic of the electro active polymer element may result in a change in a luminous transmittance of the electro active polymer element.

In addition, the electro active polymer element may be provided adjacent to at least one translucent element included in the electronic device, such that modifying the characteristic of the electro active polymer element results in a change in a luminous transmittance of light transmitted through the at least one translucent element.

According to yet another aspect, a mobile terminal may include a processor; a power supply; a housing; a light source; a plurality of substantially translucent elements included within the housing configured to pass light from the light source; at least one electro active polymer element associated with the plurality of substantially translucent elements; and an electrode operatively connected to the at least one electro active polymer element. The processor may be configured to apply a voltage to the electrode from the power supply in response to a trigger signal. The at least one electro active polymer element may be configured to change volume based on the applied voltage, where the change in volume results in a change in a luminous transmittance of the at least one electro active polymer element, the change in a luminous transmittance of the at least one electro active polymer element resulting in a change in light transmitted from the light source through at least one of the plurality of substantially translucent elements associated with the at least one electro active polymer element.

In addition, the mobile terminal may include a cellular telephone and the trigger signal may include one of an incoming call signal or an incoming message signal.

BRIEF DESCRIPTION OF THE DRAWINGS

The present invention will now be described in more detail in relation to the enclosed drawings, in which.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Embodiments described herein relate to an electronic device and a method. It should be understood that the present invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present electronic device or method to any of the particular forms disclosed, but on the contrary, the present electronic device and method is to cover all modifications, equivalents, and alternatives falling within the scope of the invention as defined by the claims.

Figure 1:
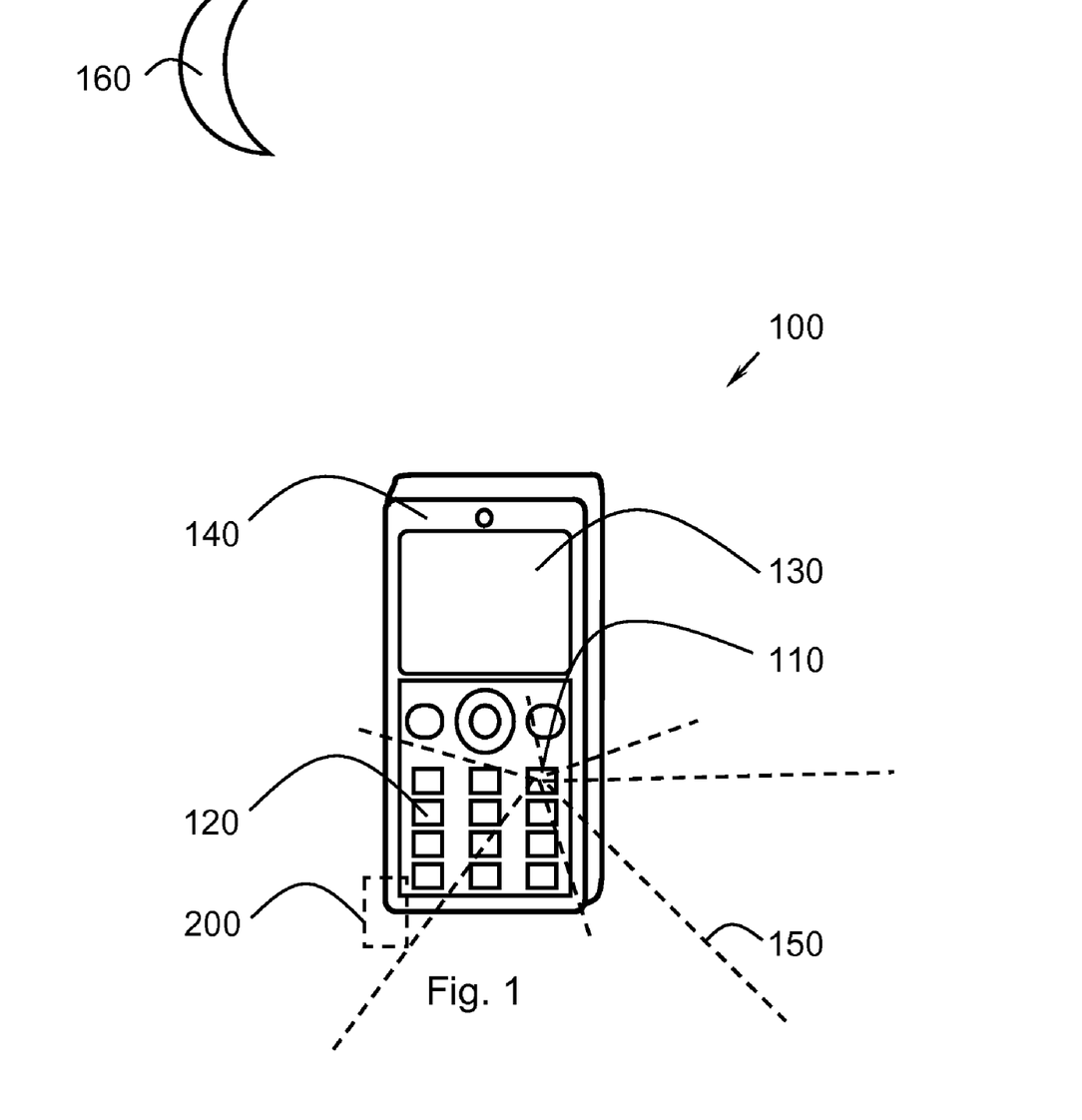
FIG. 1 is a block diagram illustrating an embodiment of an electronic device.

FIG. 1 schematically shows a front view of an electronic device 100 according to some embodiments described herein. As described below, electronic device 100 may be described in relation to a cellular phone, which is a variation of such a device according to some embodiments. Electronic device 100 may however include, for example, a portable communication device of some other type, such as a cordless phone, a communication module, a walkie-talkie, a hunting radio, a baby monitor, a radio communications transceiver, a PDA, a laptop, a handheld computer, or any other type of portable electronic device 100. Electronic device 100 may, in some embodiments, be a foldable portable communication device such as a clamshell or foldable knife type cellular phone. Furthermore, electronic device 100 may, according to some embodiments, include a non-mobile or substantially stationary device, such as a desktop computer. However, electronic device 100 may as well be any electronic device, including an electronic device that does not include communication ability at all, such as e.g., a gaming machine, a notepad, a music player such as a MP3 player, a camera, a video camera, a flash light, a head-lamp, a navigation device such as a GPS receiver or any other type of electronic device 100.

As used herein, electronic device 100 may be portable, immovable, transportable, movable, irremovable, stationary, installed in a vehicle, aeronautical, maritime, or land-based, or situated and/or configured to operate locally and/or in a distributed fashion at any other location(s) on earth, under the sea and/or in space. Electronic device 100 as herein described may further be configured for handheld and/or hands-free use.

As illustrated in FIG. 1, electronic device 100 may include a front side, facing the observer of FIG. 1 as well as a back side, opposite to the front side. Further, electronic device 100 may include two front long sides, one to the left of the front and one to the right. Electronic device 100 may also include two front short sides, one front short side situated under the front and one front short side over the front. Further yet, electronic device 100 may include a left back long side opposite to the left front long side. Also, electronic device 100 may include a right back long side opposite to the right front long side. Still further, electronic device 100 may include a lower back short side situated opposite to the lower front short side and an upper back short side situated opposite to the upper front short side.

Electronic device 100 may, according to some embodiments, include a display 130. Further, electronic device 100 may be enclosed, at least partly by a housing 140. Housing 140 may, according to some embodiments, be translucent, and/or transparent, in its entirety. According to some embodiments, housing 140 may include some translucent parts while some other parts of housing 140 may be opaque. Further, according to some embodiments, different parts of housing 140 may have different degree of transparency.

Thereby, housing 140, or parts of housing 140 may be used for displaying information to a user, such as indicating that an SMS has arrived, in accordance with embodiments described herein. In this manner, information may be displayed to a user without alarming the environment with sound signals or audible alerts.

Housing 140 may include an area where a data input means in the form of e.g. a keypad is provided. When the data input means is touched in an area where keys 110, 120 is provided, information corresponding to this key 110, 120 may be registered by the data input means and entered into electronic device 100. According to the illustrated embodiment, key 110 may be configured to, at least momentarily, pass out light 150, emitted from a light source situated inside electronic device 100. Remaining keys 120 may be, in this illustrated embodiment, prevented from passing out light 150. As shown in FIG. 1, light 150 is illustrated by a number of dashed lines, which however is a completely fictitious representation of light 150. However, thus an illumination may be made in a dark environment, e.g., at night time in the faint light from the moon 160. Keys 110, 120 may have a particular configuration, making the described light effect possible, and will be described in additional detail below.

Figure 2A:
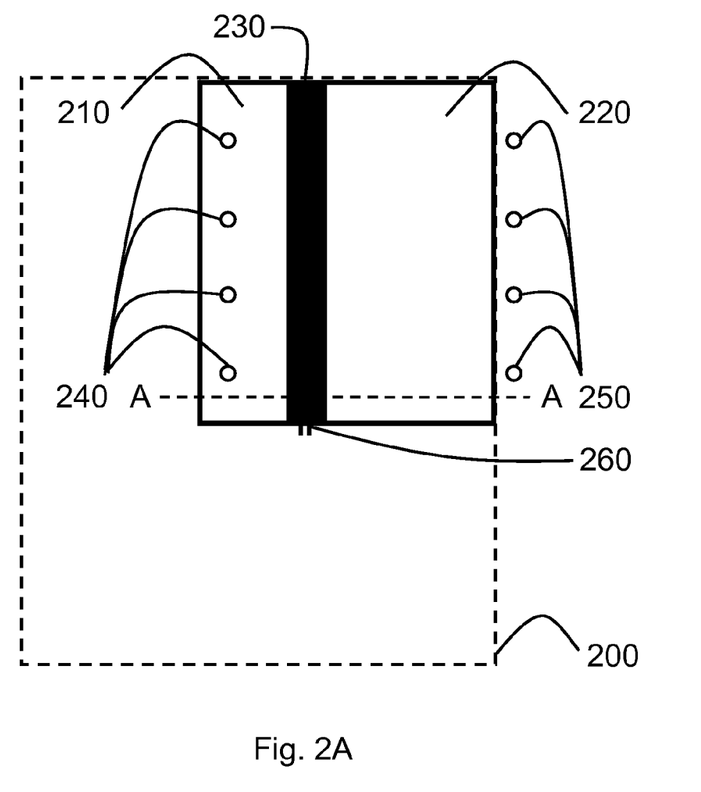
FIG. 2A is a block diagram illustrating an embodiment of an electronic device comprising a volume dividable into two separate volumes by an electro active polymer element.

FIG. 2A illustrates a cross-section of a part 200 of electronic device 100 comprising housing 140. The illustration in FIG. 2A is intended to exemplify the general principles of the present method and device only, and may by no means be regarded as limiting the design of housing 140 of electronic device 100, which design is to be limited only by the claims.

Figure 2B:
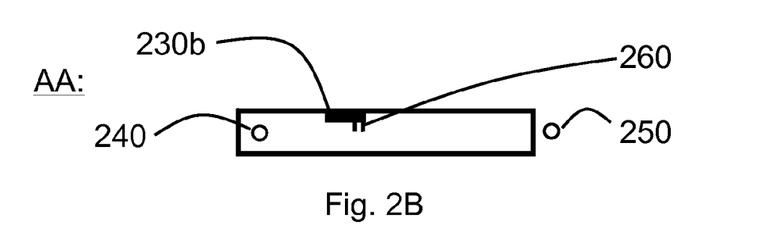
FIG. 2B is a block diagram illustrating a section of an embodiment of an electronic device, comprising a contracted electro active polymer element.
Figure 2C:
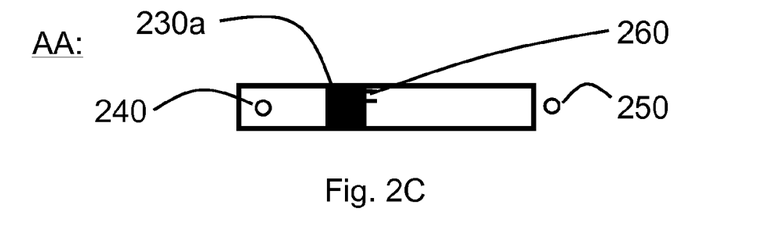
FIG. 2C is a block diagram illustrating a section of an embodiment of an electronic device, comprising an expanded electro active polymer element.

For the sake of clarity and in order not to render unnecessary aggravating circumstances for the uninitiated reader to comprehend the present method and device, any internal electronics of electronic device 100 not necessary for the present method and device has been omitted from the FIGS. 2A-2C.

Part 200 of housing 140 may include or at least be enlighten by at least one light source 240, 250. Such plurality of light sources 240, 250 may, according to some embodiments, include light sources 240, 250 of different colors. In some implementations, light source 240, 250 may include a Light-Emitting Diode (LED), an incandescent light bulb, an electric lamp, an arc lamp, a fluorescent light, a high-intensity discharge lamp, an xenon light, a halogen lamp, Electrolum inicent film, flashes or any other convenient source capable of emitting photons, thus creating an artificial light 150 within and/or outside of the visible spectrum. In one exemplary implementation, emitted light 150 from light source 240, 250 may have a wavelength between approximately 400 nm and 750 nm.

However, according to some embodiments, light source 240, 250 may be adapted to emit light 150 with a wavelength outside of the visible spectrum, such as, for example, infrared light or even ultraviolet light. In some embodiments, light source 240, 250 may be adapted to emit infrared light having a wavelength of between approximately 750 nm and 1 mm. In some embodiments, light source 240, 250 may be adapted to emit ultraviolet light 150 having a wavelength of between approximately 10 nm and 400 nm. Different light sources 240, 250 included within electronic device 100 may be adapted to emit light 150 having a wavelength outside of the visible spectrum, but with different wavelengths, such as infrared light 150 and ultraviolet light 150. Further, according to some embodiments, electronic device 100 may include light sources 240, 250 adapted to emit visible light 150 having different wavelengths, such that they emit light having different colors, such as red, blue, etc. According to some further embodiments, some light sources 240, 250 may be adapted to emit infrared light and some light sources 240, 250 may be adapted to emit ultraviolet light and/or light within the visible spectrum.

According to some embodiments, electronic device 100 may include light sources 240, 250 adapted to change the wavelength of emitted light 150, such that the user may switch between letting light sources 240, 250 emit light 150 with different wavelengths, and therefore having different colors.

An advantage of using one or more LEDs as light sources 240, 250 for emitting light 150 may be that they are relatively cheap, consume a modest amount of power, and they are robust in comparison with at least some other light sources 240, 250. Also, LEDs, in general, have a relatively long life time. The fact that a LED flash operates from a low voltage supply is also important, since this may reduce the space required for implementation. This may be an advantage in particular for portable implementations.

As illustrated in FIG. 2a, part 200 of housing 140 may be dividable into a plurality of separate translucent parts 210, 220, such as at least two separate translucent parts 210, 220 by an electro active polymer element 230. The at least two separate translucent parts 210, 220 may be seen as two volumes included within housing 140. The surface, or at least the front surface, of translucent parts 210, 220 may include an at least partly translucent and/or transparent elastic or non elastic shielding layer, having an upper side facing the exterior of electronic device 100. This layer may be flexible and may be provided through, for example, silicone. In other implementations, translucent parts 210, 220 may include a solid material layer which may be made of a solid plastics material, such as, for example, Poly Ethylene Therephthalate (PET), or any other suitable amorphous thermoplastic polymer.

In one implementation consistent with embodiments described herein, electro active polymer element 230 may be formed of an ionic electro active polymer such as an Ionic Polymer Gel. However, it should be understood that electro active polymer element 230 may also/instead include an Ionomeric Polymer-Metal Composite, Carbon Nanotubes, etc. Electro active polymer element 230 may according to some embodiments be represented by include a dielectric electro active polymer.

As shown in FIG. 2a, electro active polymer element 230 may include a set of electrodes 260. In one implementation, electro active polymer element 230 may be arranged to adjust its physical volume when a voltage is applied to, or across, electrodes 260. Upon application of the voltage to electrodes 260, the volume of electro active polymer element 230 may be varied, such that electro active polymer element 230 may expand in volume when voltage is supplied to electrodes 260. Alternatively, according to some other embodiments, electro active polymer element 230 may contract, or shrink in volume, when voltage is supplied to the electrodes 260.

In one implementation consistent with aspects described herein, electrodes 260 may include, for example, two electrodes, such as a first electrode and a second electrode. The first electrode may be connected to one of the sides of electro active polymer element 230, while the second electrode may be connected, for example, to a second opposing wall. By applying a voltage between these two electrodes 260, electro active polymer element 230 reacts and changes its shape.

According to some embodiments, electro active polymer element 230 may expand in size when a voltage is applied to electrodes 260. According to some embodiments, electro active polymer element 230 may contract in size when a voltage is applied to electrodes 260. When the voltage source is removed from electrodes 260, electro active polymer element 230 may return to its original shape and size, before voltage was applied to electrodes 260.

In accordance with embodiments described herein, the change in volume of electro active polymer element 230 may change the luminous transmittance of electro active polymer element 230. The luminous transmittance of electro active polymer element 230 thus may vary from opaque to completely translucent. Electro active polymer element 230 may thus, according to some embodiments, be used for letting light emit from one translucent part 210 of housing 140, without light leakage from another translucent part 220 of housing 140. However, according to some embodiments, electro active polymer element 230 may be used for fading out light emitted e.g. from one translucent part 210 of housing 140 and fading in light emitted e.g. from another translucent part 220 of housing 140.

Also, according to some embodiments, the voltage supplied to electrodes 260 may be arranged to vary continuously. This variation in voltage may result in a continuously increased or decreased volume of electro active polymer element 230. Thus, the luminous transmittance of electro active polymer element 230 may vary correspondingly, resulting in a fading effect of the light emitted from light source 240, 250. It may also result in a fluctuating light flow 150, resulting in a blinking effect, such as e.g., a stroboscopic effect.

FIG. 2B illustrates a cross section through line A-A of part 200 of housing 140 depicted in FIG. 2A. Electro active polymer element 230b is, according to the illustrated embodiment, contracted in volume, due to a certain voltage supplied to electrodes 260 of electro active polymer element 230b. Thus, light 150 from light sources 240, 250 may flow unimpeded between first translucent part 210 and second translucent part 220.

FIG. 2C also illustrates a cross section through line A-A of part 200 of housing 140 depicted in FIG. 2A. Electro active polymer element 230a is, according to the illustrated embodiment, expanded in volume, due to a certain voltage supplied to electrodes 260 of electro active polymer element 230a. In this manner, light from light source 240 may be separated from light from light source 250, such that, for example, light with one color may be emitted from first translucent part 210 and light with another color may be emitted from second translucent part 210.

In this manner, light emitted from part 200 of housing 140 may be controlled in a convenient way, in accordance with the present method and arrangement.

Figures 3A, 3B:
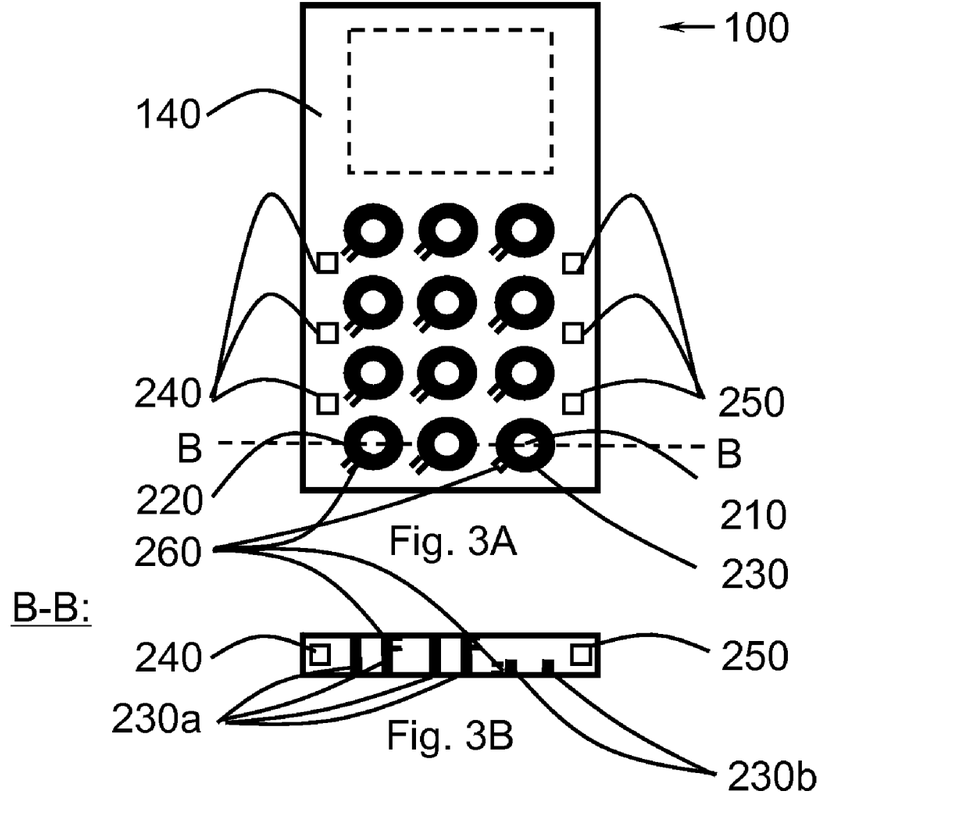
FIG. 3A is a block diagram illustrating an embodiment of an electronic device.
FIG. 3B is a block diagram illustrating section of an embodiment of an electronic device.

FIG. 3A schematically illustrates another embodiment of electronic device 100 including housing 140. As illustrated, housing 140 may include or at least be enlightened by at least one light source 240, 250. In one implementation, light source 240, 250 may be situated on an inside of housing 140. Further, housing 140 may include a plurality of separate translucent parts 210, 220 separated by electro active polymer elements 230. Translucent parts 210, 220 may be, for example, translucent keys on a keyboard of electronic device 100. However, according to some embodiments, translucent parts 210, 220 may be, for example, translucent areas on housing 140.

FIG. 3B illustrates an embodiment of a cross-section through line B-B of electronic device 100 of FIG. 3A. More specifically, cross-section B-B illustrates three separate translucent parts 210, 220, separated by three electro active polymer elements 230. As illustrated, two of electro active polymer elements 230a may be expanded in volume and electro active polymer element 230b may be contracted in volume. Accordingly, light emitted from light source 240 and/or light source 250 may be emitted from the translucent surface of translucent part 210.

Figure 4A:
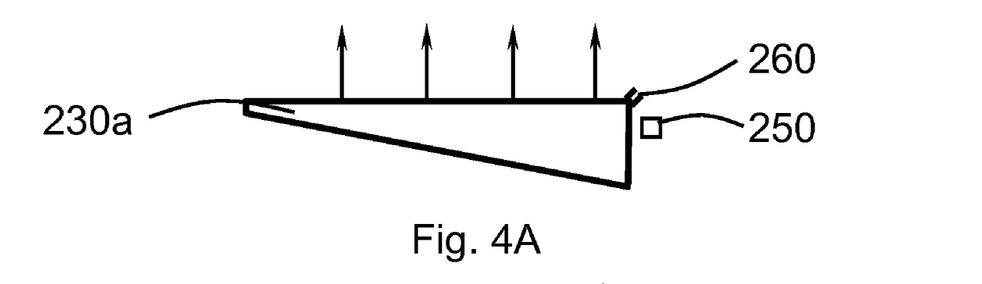
FIG. 4A is a block diagram illustrating a contracted electro active polymer element.

FIG. 4a illustrates one exemplary implementation of electro active polymer element 230a in an expanded mode. In the embodiment if FIG. 4a, electro active polymer element 230a may be translucent, and may let pass light emitted from light source 250. Light is emitted from a translucent surface of electro active polymer element 230a, even and smoothly over the entire translucent surface, as conceptually illustrated by the uniform length of the arrows in FIG. 4A.

Figure 4B:
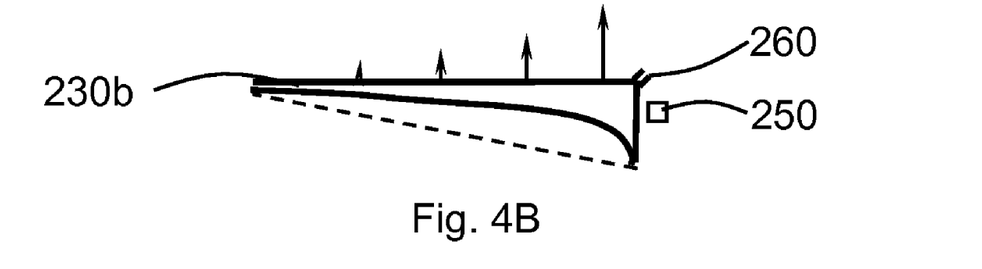
FIG. 4B is a block diagram illustrating an expanded electro active polymer element.

FIG. 4b illustrates one exemplary implementation of electro active polymer element 230b in a contracted mode. In the embodiment of FIG. 4b, translucent electro active polymer element 230b may let pass light emitted from a light source 250. However, due to the contracted shape of electro active polymer element 230b, the light is not evenly distributed over the translucent surface of electro active polymer element 230b, which may be used to create light effects, such as, for example fading the light emitted from electro active polymer element 230 in and out. These effects are conceptually illustrated by the different length of the arrows in FIG. 4B. When electro active polymer element 230b is in a contracted mode, the density of the electro active polymer element 230 may be increased. Accordingly, the translucent ability of electro active polymer element 230 may be decreased, which may create a dimming effect.

Figure 5:
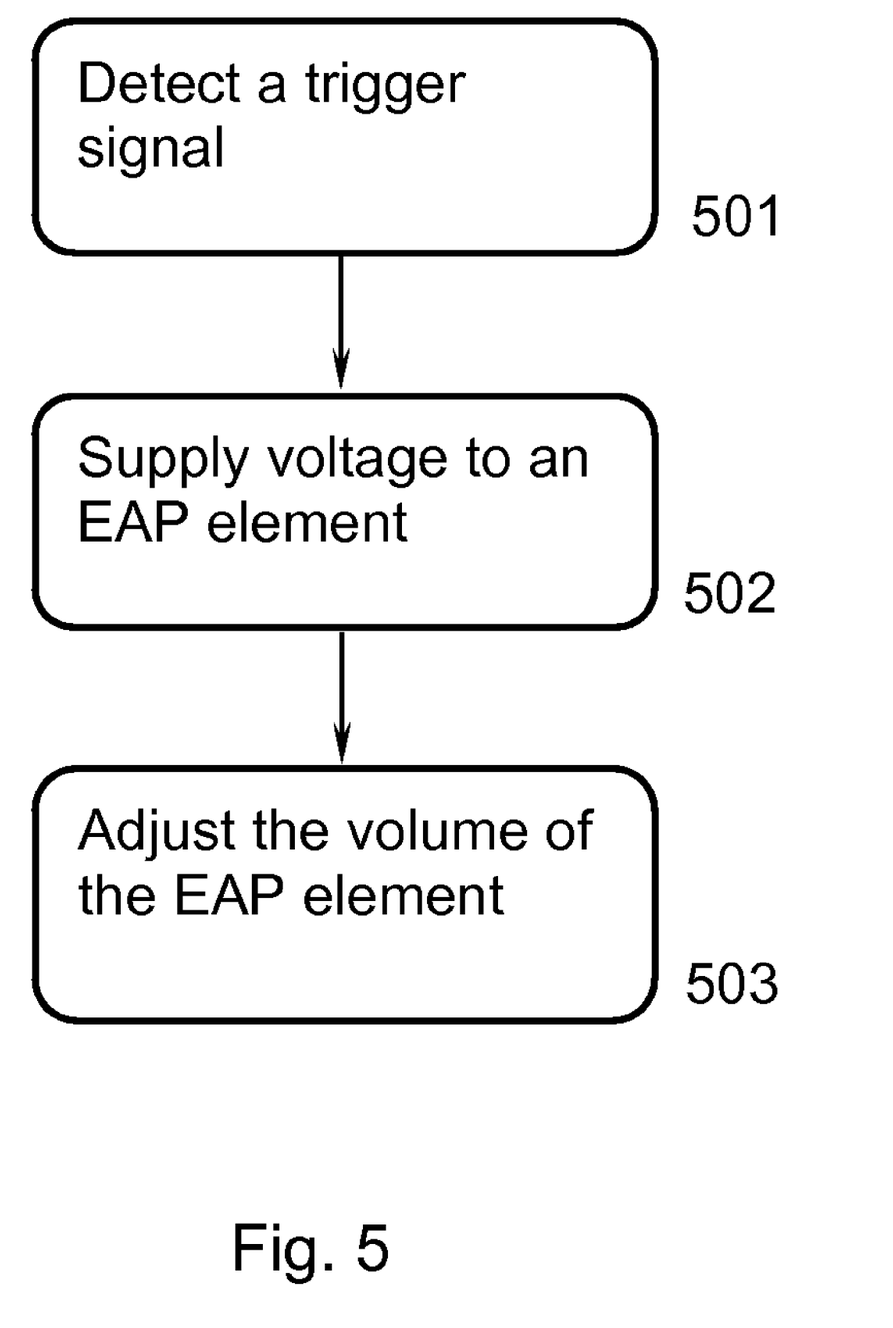
FIG. 5 is a block diagram illustrating an embodiment of a method in an electronic device.

FIG. 5 is a flow diagram illustrating an exemplary method for creating a light effect in an electronic device, e.g., electronic device 100. As described above, electronic device 100 may include electro active polymer element 230 having a volume capable of being expanded and/or contracted upon application of a suitable voltage thereto. The method may include detecting a trigger signal, supplying a voltage to electrodes 260 in electro active polymer element 230 when the trigger signal is detected. The volume of electro active polymer element 230 may be adjusted according to the supplied voltage. As the volume of electro active polymer element 230 is adjusted, a luminous transmittance of the electro active polymer element 230 may also be adjusted correspondingly, such that a light effect may be created.

For example, the created light effect may include, for example, fading a light in and/or out, fading light from one translucent part 210 to another translucent part 220, etc. Alternatively, the created light effect may include shifting light emission from different translucent parts 210, 220 such that a "walking light effect" may be created. The light effect may also include, for example, illuminating the keys of a telephone number that is calling or that the user intends to call. The created light effect, according to some embodiments, may also emit light such that a flash light functionality may be achieved. The created light effect may be activated for signaling or calling the attention of the user, e.g. when an incoming telephone call or message, such as an SMS message is arriving. The light effect may, according to some embodiments, be used to illuminate a certain part of electronic device 100 in order to indicate to a user the mode of operation of electronic device 100, such as e.g. a mute mode, camera mode etc.

In accordance with one implementation consistent with embodiments described herein, a method for electronic device 100 creating the above-described light effects may include a number of blocks 501-503. It is however to be noted that some of the described method steps are optional and only included within some embodiments. Further, it is to be noted that blocks 501-503 may be performed in any arbitrary chronological order and that some of them, e.g. block 501 and block 503, or even all blocks may be performed simultaneously or in an altered, arbitrarily rearranged or even completely reversed chronological order.

The method of FIG. 5 may begin upon receipt and detection of a trigger signal (block 501). In one implementation, detection of the trigger signal may indicate when and how voltage is to be applied to the electrodes 260 in electro active polymer element 230. For example, the trigger signal may be generated when an action associated with a certain light scheme is triggered, such as e.g., an SMS is received or the user activates the camera function of the electronic device 100.

Voltage may be applied electrodes 260 in electro active polymer element 230 (block 502). In one implementation, the voltage may be applied from a voltage source, such as e.g., a battery included within electronic device 100. Further, according to some embodiments, voltage may be applied to a light source 240, 250 within the housing 140.

The volume of the electro active polymer element 230 may be adjusted, based on the applied voltage (block 503). For example, the volume of electro active polymer element 230 may, according to some embodiments, increase when the voltage is applied to electrodes 260 of electro active polymer element 230. However, according to some embodiments, the volume of electro active polymer element 230 may, according to some other embodiments, decrease when the voltage is applied to electrodes 260 of electro active polymer element 230. In this manner, the luminous transmittance of the electro active polymer element 230 may be adjusted, such that a light effect is created, as previously described.

In one implementation consistent with embodiments described herein, the above-described method for creating a light effect in an electronic device 100 may be implemented through one or more processors (not shown) in the electronic device 100, together with computer program code for performing the functions of the method. The program code mentioned above may also be provided as a computer program product, for instance in the form of a data carrier or other computer-readable medium carrying computer program code for performing the method according to the present invention when being loaded into the processor unit. For example, a suitable computer-readable medium may include a CD ROM disc, a memory stick, or any other appropriate medium such as a disk or tape that can hold machine readable data. The computer program code can furthermore be provided as pure program code on a server and downloaded to the electronic device 100 remotely.

In this manner, a computer program comprising instruction sets for performing the method according to steps 501-503 may be used for implementing the previously described method.

As will be appreciated by one of skill in the art, implementations described herein may be embodied as electronic device 100, a method or a computer-readable medium or program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-readable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in any arbitrary object oriented programming language such as Java®, Smalltalk or C++. However, the computer program code for carrying out the steps of the present method may also be written in any conventional procedural programming languages, such as the "C" programming language and/or a lower level assembler language. The program code may execute entirely on the user's electronic device 100, partly on the user's electronic device 100, as a stand-alone software package, partly on the user's electronic device 100 and partly on a remote computing device or entirely on the remote computing device. In the latter scenario, the remote computing device may be connected to the user's electronic device 100 through a local area network (LAN) or a wide area network (WAN), or the connection may be made to an external computer, for example, through the Internet using an Internet Service Provider.

Furthermore, the present method was described in part above with reference to flowchart illustrations and/or block diagrams of electronic device 100, methods, and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

According to embodiments described above, light emitted from a certain key 210 may be provided, which enables a user to more easily locate and use the key 210 that is of interest for him/her to use. This is of advantage in keypads that are small and where the number of different keys 210, 220 is many. The user may also be provided with feedback of the key 210, such that light is emitted from a key 210 which is depressed by the user, instead of a conventional feedback "beep". This may be an advantage e.g. for people with hearing disability, who might use the keyboard for composing messages such as e.g. Short Message Service (SMS) or e-mail.

However, the described light effect may be used also e.g. in order to illuminate keys 210, 220 on the keyboard that the user may select to make a choice from, at a certain moment.

Further, the invention may be used for creating illumination effects and communicating information, such as e.g., status information to a user. As an example, a circular zone surrounding a camera lens may be illuminated when the camera function of electronic device 100 is activated, in case electronic device 100 includes camera functionality.

In another implementation, a part of the cover of electronic device 100 or even the whole cover may be illuminated, continuously or twinkling in a stroboscopic way, when a telephone call or SMS is received.

According to some embodiments, status information concerning, for example, battery load time or status, signal reception conditions, etc. may be indicated by illuminating at least a part of the covering of electronic device 100. Light in different colors may communicate different status information. For example, use of a red light may convey a low battery status, use of a yellow light may convey a less than good battery status, while use of a green light may convey a good battery status. In that way, the battery status may be interpreted and properly comprehended even by, for example, elderly people or children.

According to some embodiments, embodiments described herein may be used for realizing different game applications, e.g. by briefly illuminating one key at the time on the keyboard in a random sequence. In order to successfully play the game, the user may have to hit the key before the light goes out in order to get a point. The user who gets most points may win the game.

According to some embodiments, electronic device 100 may be used as a life saving device in an emergency situation. By illuminating all elements possible to illuminate on the electronic device 100, continuously, or in a twinkling or stroboscopic way, the attention of e.g., a rescue vehicle in an emergency situation at night time may be captured.

CONCLUSION

Implementations consistent with embodiments described herein may include an electro active polymer element included within an electronic device to provide increased control over lighting effects associated with the electronic device. Such increase light effect control may be used to provide additional information to the user visually, without the need of creating a disturbing noise such as e.g. a ring signal. Thus an improved mechanism for transferring information to a user is provided.

The invention has the following advantages. It allows for using fewer LEDs. Furthermore, illumination of certain areas and volumes may be made more precisely with reduced light leakage. In addition, a smooth and pleasant light control effect including fading in/out lights and creating dimmer effects may be achieved. Further, the invention may allow a user to read status information more easily, to locate and use a key that is of interest for him/her to use more easily and to provide him/her with feedback of the key.

Furthermore, while a series of blocks and/or processes have been described in FIG. 5, the order of the blocks and/or processes may be modified in other implementations.

It will also be apparent to one of ordinary skill in the art that various embodiments, as described above, may be implemented in cellular communication devices/systems, methods, and/or computer program products. Accordingly, the present invention may be embodied in hardware and/or in software (including firmware, resident software, micro-code, etc.). Furthermore, various embodiments may take the form of a computer program product on a computer-usable or computer-readable storage medium having computer-usable or computer-readable program code embodied in the medium for use by or in connection with an instruction execution system. The actual software code or specialized control hardware used to implement aspects consistent with the embodiments described herein is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. An electronic device, comprising:
a housing that includes a first translucent part and a second translucent part; and
at least one electro active polymer element located between the first translucent part and the second translucent part, the at least one electro active polymer element including a set of electrodes, where the at least one electro active polymer element is to change volume when a voltage is applied to the set of electrodes, where the change in volume results in a change in a luminous transmittance of light propagating between the first translucent part and the second translucent part.

2. The electronic device of claim 1, further comprising:
a light source,
where the at least one electro active polymer element is to change the luminous transmittance of a light from the light source and propagating between the first translucent part and second translucent part, when voltage is applied to the electrode.

3. The electronic device of claim 2,
where the housing encloses a plurality of translucent parts and a plurality electro active polymer elements situated between at least some of the translucent parts, and
where the plurality of electro active polymer elements are to change the luminous transmittance of light from the light source and propagating between the plurality of translucent parts when the voltage is applied to the electrode, such that an effect of light fading from a first one of the plurality of translucent parts to a second one of the plurality of translucent parts is created.

4. The electronic device of claim 3, where the plurality of translucent parts comprise keys on a keypad associated with the electronic device.

5. The electronic device of claim 1, further comprising:
a light source to illuminate at least one side of the electro active polymer.

6. The electronic device of claim 1, where the voltage applied to the electrode is to vary continuously, resulting in a continuously increased or decreased volume of the at least one electro active polymer element, such that the luminous transmittance of the at least one electro active polymer element varies correspondingly, resulting in a fading effect of the light emitted from the light source.

7. The electronic device of claim 1, where the electro active polymer comprises an ionic electro active polymer.

8. The electronic device of claim 7, where the ionic electro active polymer comprises ionic polymer gel.

9. The electronic device of claim 1, where the electro active polymer comprises one of an ionomeric polymer-metal composite or carbon nanotubes.

10. The electronic device of claim 1, where the electronic device comprises a portable communication device.

11. The electronic device of claim 10, where the portable communication device comprises a cellular telephone.

12. The electronic device of claim 1, where the electrode comprises a set of electrodes and where the voltage is applied across the set of electrodes.

13. A method for creating a light effect in an electronic device comprising a housing that encloses at least a first translucent part and a second translucent part, the electronic device further comprising an electro active polymer element between the first translucent part and the second translucent part, the electro active polymer element comprising a set of electrodes, where a change in a physical volume of the electro active polymer element provides a change in luminous transmittance of light propagating between the first translucent part and the second translucent part of the electro active polymer element, the method comprising:
detecting a trigger signal;
applying a voltage to the set of electrodes operatively coupled to the electro active polymer element upon detection of the trigger signal; and
changing a physical volume of the electro active polymer element based on the applied voltage.

14. The method of claim 13, where the trigger signal comprises a signal corresponding to an incoming call or message signal associated with the electronic device.

15. The method of claim 13, where the trigger signal comprises a signal corresponding to a mode of use of the electronic device.

16. The method of claim 13, where modifying the physical volume of the electro active polymer element results in a change in a luminous transmittance of the electro active polymer element.

17. A mobile terminal, comprising:
a processor;
a power supply;
a housing;
a light source;
a plurality of substantially translucent elements included within the housing to pass light from the light source;
at least one electro active polymer element associated with the plurality of substantially translucent elements; and
an electrode operatively connected to the at least one electro active polymer element,
where the processor is to apply a voltage to the electrode from the power supply in response to a trigger signal,
where the at least one electro active polymer element is to change volume based on the applied voltage, where the change in volume results in a change in a luminous transmittance of the at least one electro active polymer element, the change in a luminous transmittance of the at least one electro active polymer element resulting in a change in light transmitted from the light source through at least one of the plurality of substantially translucent elements associated with the at least one electro active polymer element.

18. The mobile terminal of claim 17, where the mobile terminal comprises a cellular telephone and where the trigger signal includes one of an incoming call signal or an incoming message signal.

* * * * *